Patented Mar. 11, 1947

2,417,054

UNITED STATES PATENT OFFICE 2,417,054

CATALYSIS

George R. Bond, Jr., Paulsboro, N. J., assignor to Houdry Process Corporation, Wilmington, Del., a corporation of Delaware No Drawing. Application May 9, 1944,
Serial No. 534,796

7 Claims. (Cl. 196—52)

1

The present invention relates to new and improved catalytic methods for the production of low boiling hydrocarbons such as gasoline from higher boiling hydrocarbons, in particular heavy gas oils or residua.

The cracking of light and heavy gas oils catalytically are closely related. However, it is recognized in the industry that specifically the two fields are separate and distinct. The evaluation of catalysts by cracking light gas oils gives little if any information as to the value of those catalysts when employed for the cracking of heavy stock. Thus, it has been found with some catalysts that when two catalysts are compared one will show up better than the other on the basis of light stock, but worse than the other on the basis of heavy stock. This relationship is, of course, not universal. It cannot be said that catalysts which are poor for light stock are good for heavy stocks. For the above reasons the search for good catalysts for heavy stock cracking has become virtually a separate and independent problem from the development of catalysts for light stock cracking.

Objects of the present invention are to provide new and improved methods for the cracking of heavy hydrocarbon stocks such as crude residua, tar separator overhead from bottoms cuts, and the like; to provide new and improved catalysts for the production of gasoline from such heavy stocks; and to provide catalytic methods of cracking heavy stocks of the type indicated to low boiling hydrocarbons with minimized losses to gas and coke. Other objects and advantages of the present invention will become apparent as the description proceeds.

The charge stocks with which the present invention deals are those which have a 50% or mid-boiling point above about 650° F. Such heavy oils may be derived from crude petroleum, from coal tar, from shale oil, from oil produced by destructive hydrogenation or other methods of synthesizing heavy hydrocarbons. Oils having a mid-boiling point above about 650° F. are extremely difficult to crack catalytically on an economical basis. The catalysts in the art tend to produce undue amounts of gas and coke. The coke produced can be considered a total loss except perhaps for such purposes as the production of steam during regeneration. The gas is mainly a loss except for such light hydrocarbons as may be employed for polymerization, alkylation, dehydrogenation, or like processes.

In accordance with a preferred form of the present invention heavy hydrocarbon oils of the character indicated are contacted under cracking conditions with a catalyst constituted of a dried composite of silica and alumina of the precipitated gel type and which catalyst contains beryllia to the extent of over 1 and less than 20%. The silica is present in predominating amount in the composite.

Great latitude is possible in the method of preparing the catalysts employed in the process of this invention. Thus, a coprecipitate of silica, alumina, and beryllia may be prepared by the co-mingling of solutions of sodium silicate, a salt of aluminum or an aluminate, and a salt of beryllia or a beryllate. When the catalyst is prepared by coprecipitation, I prefer to add beryllia in amount between 5% and 15%. The production of good catalysts by coprecipitation is not dependent upon particular pH conditions. Thus, coprecipitation may advantageously be effected within the approximate range of pH 3 to 11. The coprecipitate is dried to the dried gel state following which it may be calcined. Sodium or other alkali metal should be substantially removed either before or after the drying of the mixed hydrous oxide gel. This may be effected by water washing and if desired also by treatment with an acid or a salt such as an ammonium salt, for example, ammonium chloride or sulfate. The coprecipitate may be ground and used either as a finely divided catalyst or it may be formed in suitable pellets. Alternatively, the coprecipitate may be set in the desired form and dried in the physical form in which it set up to produce the so-called "bead type" catalyst. The catalyst may then be calcined though this operation may occur after the catalyst is introduced into the cracking case during the first regeneration, at which time the catalyst is heated up generally to a temperature of between about 1000 and 1400° F.

Alternative modes of catalyst preparation involve the coprecipitation of silica and alumina in hydrous oxide gel state. This coprecipitate may be suspended in a solution of a beryllium salt which may be either precipitated upon or adsorbed by the suspended coprecipitate. Alternatively, likewise, the silica and alumina may be separately precipitated and mixed and the beryllia deposited upon either of the two precipitates before mixture or deposited on the mixture of the two. Again any one of the materials may be singly precipitated and suspended in a solution of either one or both of the other materials and the materials in solution precipitated upon the one in suspension. Thus, for example, a silica hydrogel may be prepared and suspended in a solution of beryllium and aluminum sulfates, which may then be precipitated upon the silica hydrogel. Another method of preparing the catalyst involves the preparation of a dried and purified silica-alumina mixed gel of the type heretofore disclosed in the art as cracking catalysts. This composite is then impregnated with a salt of beryllium, following which it may be further purified if desired and then either precalcined or calcined during use. During impregnation the beryllia may either be hydrolized within the silica-alumina gel or it may enter the structure thereof by base exchange.

Regardless of the method of preparation and the method of compositing the materials, substantially all the sodium should be eliminated from the composite, i. e., the composite should contain not over about 0.5% alkali metal, calculated as sodium oxide equivalent.

While the preferred catalyst composites disclosed herein contain substantially only silica, alumina and beryllia, equivalent improvement may be obtained in other catalysts which contain silica and alumina as, for example, catalysts containing silica, alumina and zirconia to which the beryllia is added in accordance with the present invention. Likewise other catalytic materials may be incorporated in the silica-alumina-beryllia composite in small amounts as, for example, manganese, molybdenum, chromium, vanadium, thorium, magnesium, calcium and the like oxides.

It has heretofore been observed in the cracking of light gas oils that catalysts containing silica, alumina and more than 1% beryllia, are not as active as equivalent catalysts containing no beryllia. This observation I have confirmed. The catalysts employed in the present process do not produce as much gasoline per pass when charging a light gas oil as do catalysts containing only silica and alumina.

However, these catalysts containing between 1 and 20% beryllia do have substantial advantages in the cracking of heavy stocks. Generally the gasoline produced per pass is greater than with the equivalent silica-alumina catalysts. Likewise, it appears that in all cases the gasoline to gas and gasoline to coke ratios are substantially improved. Likewise, the liquid recovery is considerably improved. More than 1% of beryllia is employed since amounts less than 1% appear not to affect to cracking of heavy stocks favorably.

Catalytic conversion conditions for heavy stocks are known in the art. In general the temperature of conversion lies within the range of about 750 to 1100° F. The pressure generally lies within the range from sub-atmospheric pressure up to about 200 lbs. gauge pressure. The space rate is generally between about 0.25 and 10 volumes of feed (measured as liquid) per volume of catalyst per hour. In charging heavy stocks it is frequently desirable to mix steam or other diluent with the stock to reduce the dew point in order to have as much of the stock as possible in vapor phase.

*Example 1.*—A catalyst was prepared which contained 78.7% silica, 11.3% alumina, and 10% beryllia. The preparation was made as follows: A solution of N-brand silicate was prepared of specific gravity 1.25. A sodium aluminate solution was prepared of specific gravity 1.0424. A third solution was prepared of 23.5 parts by weight ammonium sulfate and 24.8 parts by weight of beryllium sulfate in 60.8 parts by weight water. 110 parts by volume of silicate solution were mixed with 154 parts by volume of the aluminate solution and 97 parts by volume of the beryllium sulfate, ammonium sulfate solution. The three solutions were mixed in a continuous mixing head to give rapid and complete mixing of the solutions to form a sol. The gel, which set in a matter of seconds, was allowed to synerize for 45 minutes and was then dried in an oven at a temperature of 200 to 210° F. The dried gel was washed ten times with water and four times with ammonium chloride solution following which it was washed with water until free of sulfate, following which the purified gel, substantially free of sodium, was dried. The dried gel was ground for five hours in a ball mill. Enough water was added to the powder to get a castable mix, which mix was then cast in pellet form and dried. A portion of the catalyst so prepared was calcined at a temperature of 1250° F. for four hours in 100% steam.

The catalyst so prepared was employed for cracking of a heavy cut of East Texas crude having a boiling range of 540° to 1020° F. and a 50% point of 760° F. The conditions of cracking were as follows: Catalyst temperature—850° F.; gauge pressure—7 lbs. per square inch; rate—1 volume of oil (liquid basis) per volume of catalyst per hour; steam—15 weight percentage of the oil. There was obtained a yield of gasoline equal to 46% by volume of the charge and a total liquid recovery of 94.2% by volume of charge. Losses to gas and coke were 9.8% by weight of charge to gas and 2.8% by weight of charge to coke. Equivalent silica-alumina catalysts employed for cracking of the same stocks under substantially the same conditions gave a gasoline yield of 39.8% by volume of charge and a liquid recovery of 90.9% by volume. Losses to gas and coke were 12.2% by weight of gas and 2.8% by weight of coke. It was found that this silica-alumina catalyst was more active in the cracking of a light gas oil than this silica-alumina-beryllia catalyst.

*Example 2.*—A second lot of the above described catalyst was calcined at a temperature of 1400° F. for ten hours in a mixture of 5% steam and 95% air. The catalyst so calcined was employed for the cracking of a heavier cut of East Texas crude than that employed in Example 1 and under the same conditions there stated. This produced a yield of 50.5% gasoline by weight of charge, and 91.1% volume liquid recovery, with total losses to gas and coke of 17.4% by weight. When an equivalent silica-alumina catalyst was employed for cracking the same stock under substantially the same conditions, a yield of 43.4% gasoline by volume of charge was obtained together with a total liquid recovery of 88.7% by volume. Total losses to gas and coke were 18.8% by weight.

*Example 3.*—A catalyst containing about 3% of beryllia was produced as follows: Solutions were continuously mixed at the rate of 33.9 parts by volume of an N-brand silicate solution of 1.25 specific gravity, 46.9 parts by volume of sodium aluminate solution of 1.0424 specific gravity, and 26.9 parts by volume of a solution of beryllium sulfate and ammonium sulfate prepared by mixing 2.12 parts by weight beryllium sulfate, 7.36 parts by weight ammonium sulfate, and 22 parts by weight water. The gel was prepared in the mixing head as above indicated and was purified and finished as stated in Example 1. The catalyst was calcined at 1400° F. for ten hours in a mixture of 5% steam and 95% air and employed for the cracking of the same stock and under the same conditions as in Example 2. A gasoline yield of 50% by volume of charge and a total liquid recovery of 86.9% by volume were obtained. 5.5% by weight of coke was produced and 15.3% by weight of gas. If the calcination of the comparative silica-alumina catalyst were modified in an attempt to make the cracking more severe in order to produce a higher percentage gasoline, the losses to gas and coke would increase without substantial improvement in the gasoline yield.

*Example 4.*—A catalyst was prepared which contained 74.4% by weight silica, 10.6% by weight alumina, and 15% by weight beryllia. The preparation of this catalyst was substantially in accord with that described in Examples 1 and 3. The catalyst was calcined at 1400° F. for ten hours in a mixture of 5% steam and 95% air and was employed for the cracking of the charge defined in Example 1 under the conditions there stated. There was produced a yield of 47.2% by volume of charge of gasoline with a total liquid recovery of 92.7%. Losses to gas and coke when employing this catalyst were 12.2% by weight of gas and 3.2% by weight of coke.

*Example 5.*—A catalyst was prepared which contained about 2.8% beryllia as follows: 2.99 kilograms of silica-alumina coprecipitate which had been purified of alkali metal and calcined at 1050° F. for two hours in air was dipped in 6 liters of beryllium sulfate solution containing 600 grams of beryllium sulfate tetrahydrate. The catalyst was allowed to stand in the solution for two hours at 200° F. whereby beryllia is deposited within the catalyst by hydrolysis. The catalyst was then washed five times by decantation, using 3.5 liters of water per wash. The catalyst was then dried and heat treated at 1050° F. for two hours. The catalyst so prepared was employed for cracking a tar separator overhead from a fresh bottoms cut, the catalyst temperature was 825° F.; the pressure 15 lbs. gauge; and the rate .75 volume of oil (liquid basis) per volume of catalyst per hour. There was obtained a total liquid recovery of 92.5% by weight of the charge, and 34.7% gasoline by volume of the charge. Losses to gas were 5% by weight and to coke 2.5% by weight.

I claim as my invention:

1. In the production of lower boiling hydrocarbons from heavy hydrocarbon oil having a 50% point above 650° F., the method which comprises cracking said hydrocarbon oil by contacting it under conversion conditions with a calcined composite comprising hydrous silica and alumina composited in the hydrous state said composite containing predominately silica and more than 1% and less than 20% beryllia.

2. In the production of gasoline from hydrocarbon oil having a 50% point above 650° F., the method which comprises catalytically cracking said oil in contact with a composite comprising silica, alumina, and beryllia, said composite containing a predominate amount of silica and more than 1% and less than 20% beryllia, said silica and alumina being prepared as hydrous precipitates and composited in the moist undried state.

3. The method which comprises contacting a hydrocarbon oil having a 50% point above 650° F. under cracking conditions with a composite of coprecipitated silica, alumina and beryllia containing a predominate amount of silica and more than 1% and less than 20% of beryllia.

4. The method of preparing gasoline which comprises cracking a hydrocarbon oil having a 50% point above 650° F. in contact with a composite of coprecipitated silica, alumina and beryllia substantially free of alkali metal containing silica in predominate proportion and beryllia in amount between 5% and 15%.

5. The process which comprises contacting a heavy hydrocarbon oil having a 50% point above 650° F., under cracking conditions with a composite of precipitated hydrous silica and precipitated hydrous alumina composited in the moist hydrogel state, said composite containing beryllia deposited therein from solution, said composite containing a predominate amount of silica and more than 1% and less than 20% of beryllia.

6. The process according to claim 5 in which the silica and alumina are coprecipitated.

7. In the production of gasoline boiling range hydrocarbons from hydrocarbon oil having a 50% point above 650° F., the method which comprises cracking said oil in the presence of a composite of a silica and alumina gel type cracking catalyst containing more than 1% and less than 20% beryllia.

GEORGE R. BOND, Jr.

REFERENCES CITED

The following references are of record in the file of this patent:

UNITED STATES PATENTS

| Number | Name | Date |
|---|---|---|
| 2,281,919 | Connolly I | May 5, 1942 |
| 2,289,757 | Connolly II | July 14, 1942 |
| 2,326,704 | Thiele et al. | Aug. 10, 1943 |
| 2,327,175 | Conn | Aug. 17, 1943 |
| 2,347,251 | Stoewener et al. | Aug. 25, 1944 |
| 2,361,978 | Swearingen | Nov. 7, 1944 |